United States Patent
Pack et al.

(10) Patent No.: US 10,348,641 B2
(45) Date of Patent: Jul. 9, 2019

(54) METHOD OF JOINT OPTIMIZATION OF CHANNEL SELECTION AND FRAME SCHEDULING FOR COEXISTENCE OF LTE AND WLAN IN UNLICENSED BAND

(71) Applicant: UCOMM TECHNOLOGY Co., Ltd., Anyang-si (KR)

(72) Inventors: Sang Heon Pack, Seoul (KR); Haneul Ko, Goyang-si (KR); Jaewook Lee, Seoul (KR)

(73) Assignee: UCOMM TECHNOLOGY CO., LTD., Anyang-si (KR)

( * ) Notice: Subject to any disclaimer, the term of this patent is extended or adjusted under 35 U.S.C. 154(b) by 0 days.

(21) Appl. No.: 15/915,208

(22) Filed: Mar. 8, 2018

(65) Prior Publication Data

US 2018/0270166 A1    Sep. 20, 2018

(30) Foreign Application Priority Data

Mar. 15, 2017    (KR) ........................ 10-2017-0032736

(51) Int. Cl.
*H04W 28/26*    (2009.01)
*H04L 12/911*    (2013.01)
(Continued)

(52) U.S. Cl.
CPC ........... *H04L 47/827* (2013.01); *H04W 28/26* (2013.01); *H04W 72/1215* (2013.01);
(Continued)

(58) Field of Classification Search
None
See application file for complete search history.

(56) References Cited

U.S. PATENT DOCUMENTS

| 7,424,029 B1 * | 9/2008 | Shum ................... H04L 12/4035 370/445 |
| 2015/0139108 A1 * | 5/2015 | Takano ................. H04W 16/16 370/329 |
| 2017/0099663 A1 * | 4/2017 | Lee ......................... H04W 4/70 |

FOREIGN PATENT DOCUMENTS

| KR | 10-2017-0009303 | 1/2017 |
| WO | 2016-163802 | 10/2016 |
| WO | 2017-010764 | 1/2017 |

OTHER PUBLICATIONS

Haneul Ko et al. "A Fair Listen-Before-Talk Algorithm for Coexistence of LTE-U and WLAN", IEEE Transactions on Vehicular Technology (TVT), vol. 65, No. 12, pp. 10116-10120, Dec. 2016.
(Continued)

*Primary Examiner* — Ayanah S George
(74) *Attorney, Agent, or Firm* — Lex IP Meister, PLLC

(57) ABSTRACT

Disclosed is a method of joint optimization of channel selection and frame scheduling for coexistence of LTE and WLAN in an unlicensed band, the method being performed by a baseband unit (BBU) pool and the method includes: selecting a component carrier (CC) having a highest idle probability by considering an idle probability of the CC for the unlicensed band; determining the number $N^I$ of idle subframes in the selected CC by considering a residence time in a WLAN system queue; and allocating a resource block (RB) to an LTE user terminal in a cell based on the number of selected CCs and the number of idle subframes and which appropriately selects a resource in a frequency domain and a time domain in LTE to acquire high throughput and fairness in the LTE and the WLAN in the unlicensed band.

7 Claims, 11 Drawing Sheets

(51) Int. Cl.
    *H04W 76/15*     (2018.01)
    *H04W 72/12*     (2009.01)
    *H04W 88/06*     (2009.01)
    *H04W 84/12*     (2009.01)
    *H04W 16/14*     (2009.01)

(52) U.S. Cl.
    CPC ........ *H04W 76/15* (2018.02); *H04J 2211/005* (2013.01); *H04W 16/14* (2013.01); *H04W 84/12* (2013.01); *H04W 88/06* (2013.01)

(56) References Cited

OTHER PUBLICATIONS

Zhangyu Guan et al., "CU-LTE: Spectrally-Efficient and Fair Coexistence Between LTE and Wi-Fi in Unlicensed Bands", Proc. IEEE Infocom, Apr. 2016.

"Remaining details on channel access framework for eLAA", GPP TSG-RAN WG1 Meeting #86, R1-167345, Aug. 2016.

* cited by examiner

FIG. 4

| Sub-algorithm 1 CC selection algorithm for unlicensed band. |
| --- |
| 1: Make $C_k$ and $C_k^S$ <br> 2: $L \leftarrow 0$ <br> 3: repeat <br> 4:    $k \leftarrow k + 1$ <br> 5:    repeat <br> 6:       Obtain $p_{k,c}$ for $\forall c \in C_k$ <br> 7:       Select CC which has the highest $p_{k,c}$ in $C_k$ <br> 8:       Remove the selected CC from $C_k$ and add the selected CC to $C_k^S$ <br> 9:    until $\Omega(C_k^S) = N_{CC}^k$ <br> 10: until $k = O(K)$ |

Sub-algorithm 2 $N^I$ decision algorithm

---

1: Initialize parameters (i.e., $\sigma$, $\mu$, and $\lambda$)
2: $k \leftarrow 0$, $N^I_{k,c} \leftarrow 0$ for $\forall k$, $\forall c \in C^S_k$
3: repeat
4:   $k \leftarrow k + 1$
5:   repeat
6:     Obtain $S^B_{k,c}$ for $\forall c \in C^S_k$
7:     repeat
8:       $N^I_{k,c} \leftarrow N^I_{k,c} + 1$
9:       if $N \neq 9$ and $(N^A_{k,c}/N_S)\mu_{k,c} > \lambda_{k,c}$ then
10:         go to Step 8
11:       else if $N^I_{k,c} = 9$ and $(N^A_{k,c}/N_S)\mu_{k,c} < \sigma$ then
12:         Remove the curreiit CC c from $C^S_k$
13:       end if
14:       Compute $S^A_{k,c}$ by $\dfrac{1}{(N^I_{k,c}/N)\mu_{k,c} - \lambda_{k,c}}$
15:       if $N^I_{k,c} \neq 9$ and $S^A_{k,c}/S^B_{k,c} > \sigma$ then
16:         go to Step 8
17:       else if $N^I_{k,c} = 9$ and $S^A_{k,c}/S^B_{k,c} > \sigma$ then
18:         Remove the curreiit CC c from $C^S_k$
19:       end if
20:     until $S^A_{k,c}/S^B_{k,c} \leq \sigma$
21:   until $N^I_{k,c}$ for $\forall c \in C^S_k$ is decided
22: until $k = O(K)$

FIG. 6

Sub-algorithm 3 RB allocation

1: Obtain $m$ for $\forall c$, $\forall c$, $\forall c$ by using CQI report from users
2: Make $CR^A$ $\phantom{xx} S_k$
3: $i \leftarrow 0$, $k \leftarrow -1$
4: repeat
5: $\quad k \leftarrow k + 1$
6: $\quad$ if $n_i \geq N_F$ then
7: $\quad\quad$ Search $(c*, r*) = \arg\max_{c \in C_{L,r}} m_{i,c,r}$
8: $\quad\quad$ if $(c,r) \notin CR^A$ then
9: $\quad\quad\quad$ Assign $(c*, r*)$ in all subfraine to user $i$
10: $\quad\quad\quad$ Add $(c*, r*)$ to $CR^A$
11: $\quad\quad\quad$ $n_i = 0$
12: $\quad\quad$ end if
13: $\quad$ end if
14: until $i = N_I$
15: repeat
16: $\quad k \leftarrow k + 1$
17: $\quad$ if $N_{CA} < N_{CC}^k$ then
18: $\quad\quad$ Assign users in location $k$ to selected CCs in location $k$
19: $\quad$ end if
20: $\quad$ repeat
21: $\quad\quad r \leftarrow 0$
22: $\quad\quad$ repeat
23: $\quad\quad\quad r \leftarrow r + 1$
24: $\quad\quad\quad$ Search $i* = \arg\max_{i \in I_{k,c}} m_{i,c,r}$
25: $\quad\quad\quad$ if $(c*, r*) \notin CR^A$ then
26: $\quad\quad\quad\quad$ Assign RB $r$ of CC $c$ to user $i*$ during all available subframes
27: $\quad\quad\quad$ end if
28: $\quad\quad$ until for $\forall r \in R$
29: $\quad\quad$ if $N_{CC}^{i*} < N_{CA}$ then
30: $\quad\quad\quad$ Remove user $i*$ from $I_{k,c}$
31: $\quad\quad$ end if
31: $\quad$ until for $\forall c \in C_k^S \cup C_L$
31: until $k = O(K)$

METHOD OF JOINT OPTIMIZATION OF CHANNEL SELECTION AND FRAME SCHEDULING FOR COEXISTENCE OF LTE AND WLAN IN UNLICENSED BAND

CROSS-REFERENCE TO RELATED APPLICATION

This application claims priority to and the benefit of Korean Patent Application No. 10-2017-0032736 filed in the Korean Intellectual Property Office on Mar. 15, 2017, the entire contents of which are incorporated herein by reference.

BACKGROUND OF THE INVENTION

(a) Field of the Invention

The present invention relates to a method for coexistence of LTE and WLAN in an unlicensed band. More particularly, the present invention relates to a method of joint optimization of channel selection and frame scheduling for coexistence of LTE and WLAN in an unlicensed band.

(b) Description of the Related Art

With the rapid increase in the number of mobile terminals, interest in increasing a radio resource capacity is increasing. In particular, several major companies are actively using long-term evolution (LTE) systems in an unlicensed band (LTE in unlicensed band (LTE-U)).

However, the LTE system and a wireless local area network (WLAN) system that has already used the unlicensed band are not designed to operate in the same band. That is, since there is no method in which the LTE system and the WLAN system can coexist with each other, there is a problem in that desired performance cannot be obtained if the LTE system is used in the unlicensed band as it is.

In particular, since the LTE system performs transmission without checking a channel status, there is a high possibility that the performance of the WLAN system will decrease. To prevent the decrease of the performance, a coexistence method between the two systems is needed. The coexistence method includes a coexistence method through channel selection and a coexistence method through frame scheduling.

The channel selection and the frame scheduling need to be considered simultaneously for effective coexistence of the LTE and the WLAN (that is, for acquiring high throughput and fairness). However, there is a problem in that a research that considers both the LTE and the WLAN has not yet been reported. In the research, a coexistence method considering both the LTE and the WLAN is developed.

The above information disclosed in this Background section is only for enhancement of understanding of the background of the invention and therefore it may contain information that does not form the prior art that is already known in this country to a person of ordinary skill in the art.

SUMMARY OF THE INVENTION

Accordingly, the present invention has been made in an effort to provide a coexistence method that guarantees high throughput and fairness by jointly considering channel selection and frame scheduling of LTE and WLAN in an unlicensed band.

The present invention has also been made in an effort to provide a coexistence method that guarantees high throughput and fairness for a mobile terminal by jointly considering channel selection and frame scheduling of LTE and WLAN in an unlicensed band in an overlapped cell including a small cell.

An exemplary embodiment of the present invention provides a method of joint optimization of channel selection and frame scheduling for coexistence of LTE and WLAN in an unlicensed band. The method may be performed by a baseband unit (BBU) pool and the method which includes: selecting a component carrier (CC) having a highest idle probability by considering an idle probability of the CC for the unlicensed band; determining the number $N^I$ of idle subframes in the selected CC by considering a residence time in a WLAN system queue; and allocating a resource block (RB) to an LTE user terminal in a cell based on the number of selected CCs and the number of idle subframes and appropriately selects a resource in a frequency domain and a time domain in LTE to acquire high throughput and fairness in the LTE and the WLAN in the unlicensed band.

In an exemplary embodiment, the cell may be a macro cell served by an LTE base station (eNB), the cell may include a plurality of small cells served by an LTE-U base station (remote radio head (RRH)), and a WLAN service may be performed by at least one WLAN AP in at least some of the plurality of small cells.

In an exemplary embodiment, in selecting the CC having the highest idle probability, $N_{CC}^k$ CCs having the idle probability in a higher order may be selected with respect to k respective plural small cells and the $N_{CC}^k$ CCs may be determined according to carrier aggregation (CA) currently provided by a k-th small cell. In addition, in selecting $NCC^k$ CCs having the idle probability in the higher order, $NCC^k$ CCs may be selected in an order in which the number of WLAN APs using the CC is smaller.

In an exemplary embodiment, the determining of the number $N^I$ of idle subframes in the selected CC may include calculating $S_{k,c}^B$ which is the residence time in the WLAN system queue when no idle subframe is allocated, and determining the number $N_{k,c}^I$ of idle subframes using CC c which is a c-th CC in a k-th small cell based on $(N_{k,c}^I/Ns) \mu_{k,c} < \lambda_{k,c}$. Herein, Ns, $\mu_{k,c}$, and $\lambda_{k,c}$ may represent the number of subframes per frame, and a service processing speed and a packing arrival speed of a WLAN system using the CC c in the k-th small cell, respectively.

In an exemplary embodiment, the determining of the number $N^I$ of idle subframes in the selected CC may further include determining not to use the CC c when the number $N_{k,c}^I$ of idle subframes in which the WLAN system queue may be stabilized does not exist, and determining the minimum number of idle subframes in which the rate of the increase in residence time in the WLAN system queue does not exceed σ which is a predetermined level while increasing the number $N_{k,c}^I$ of idle subframes by one for another CC c.

In an exemplary embodiment, in the allocating of the resource block (RB) to the LTE user terminal in the cell based on the number of selected CCs and the number of idle subframes, the RB may be preferentially allocated to a first LTE user which may not be allocated with the RB for a predetermined time or more, and the RB capable of guaranteeing maximum throughput may be allocated to the first LTE user, the remaining RBs may be allocated to a second LTE user which is an LTE user having a good channel state in order to maximize throughput.

Another exemplary embodiment of the present invention provides a method of joint optimization of channel selection and frame scheduling for coexistence of LTE and WLAN in an unlicensed band, which is performed by an LTE terminal and includes allocating a resource block (RB) based on the number of CCs selected by a baseband unit (BBU) pool and the number $N^I$ of idle subframes. Herein, the selected CC may represent a CC having a highest idle probability considering an idle probability of the CC) with respect to the unlicensed band and the number $N^I$ of selected idle subframes may be determined by considering a residence time in a WLAN system queue in the selected CC. In addition, the method may include receiving data from an LTE-U base station (remote radio head (RRH)) through the selected RB.

According to an exemplary embodiment of the present invention, in a method of joint optimization for coexistence of channel selection and frame scheduling of LTE and WLAN in an unlicensed band, a resource is appropriately selected in a frequency domain and a time domain in the LTE to acquire high throughput and fairness in the LTE and the WLAN in the unlicensed band.

Further, in the optimization method according to the exemplary embodiment of the present invention, a component carrier is selected and the number of idle subframes is controlled to acquire the high throughput and the fairness in the LTE and the WLAN in the unlicensed band in an overlapped cell including a small cell.

BRIEF DESCRIPTION OF THE DRAWINGS

FIG. 4 illustrates a pseudo code of a sub-algorithm for selecting a CC by considering an idle probability of the CC according to the present invention.

FIG. 5 illustrates a pseudo code of a sub-algorithm for determining the number of idle sub-frames by considering a residence time in a WLAN system queue according to the present invention.

FIG. 6 illustrates a pseudo code of an algorithm for RB allocation, which maximizes throughput while maintaining fairness among LTE users according to the present invention.

DETAILED DESCRIPTION OF THE EMBODIMENTS

Figure 1:
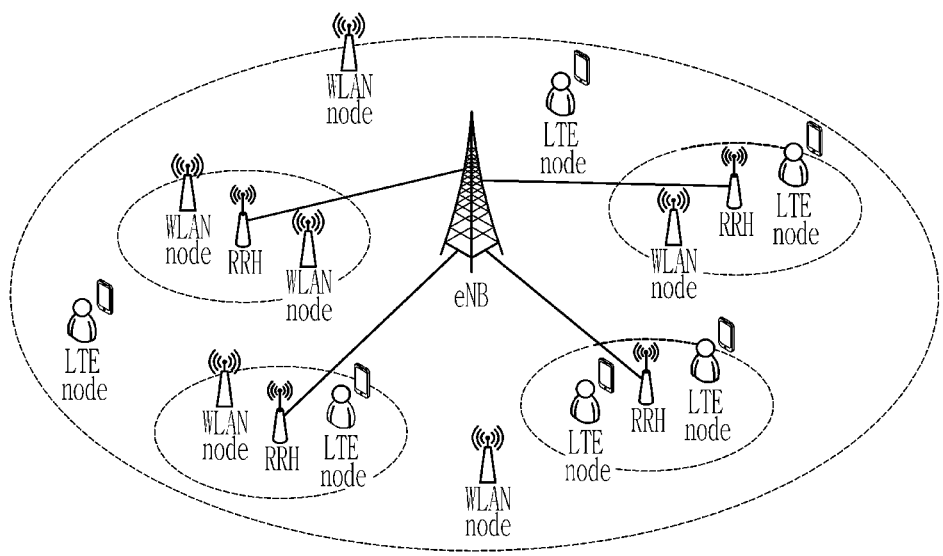
FIG. 1 illustrates a wireless communication system model according to the present invention.

The aforementioned features and effects will be more apparent through the detailed description below related to the accompanying drawings, and thus those skilled in the art to which the present invention pertains will easily implement the technical spirit of the present invention. The present invention may have various modifications and various embodiments and specific embodiments will be illustrated in the drawings and described in detail in the specification. However, this does not limit the present invention within specific embodiments, and it should be understood that the present invention covers all the modifications, equivalents and replacements within the idea and technical scope of the present invention. Terms used in the present specification are used only to describe specific exemplary embodiments, and are not intended to limit the present invention.

In describing each drawing, reference numerals refer to like elements.

Terms including as first, second, and the like are used for describing various constituent elements, but the constituent elements are not limited by the terms. The terms are used only to discriminate one constituent element from another constituent element.

For example, a first component may be referred to as a second component, and similarly, the second component may be referred to as the first component without departing from the scope of the present invention. A term "and/or" includes a combination of a plurality of associated disclosed items or any item of the plurality of associated disclosed items.

If it is not contrarily defined, all terms used herein including technological or scientific terms have the same meanings as those generally understood by a person with ordinary skill in the art.

Terms which are defined in a generally used dictionary should be interpreted to have the same meaning as the meaning in the context of the related art, and are not interpreted as an ideal meaning or excessively formal meanings unless clearly defined in the present application.

Suffixes "module", "block", and "unit" for components used in the following description are given or mixed in consideration of easy preparation of the specification only and do not have their own distinguished meanings or roles.

Hereinafter, a preferred embodiment of the present invention will be described hereinafter with reference to the accompanying drawings so that those skilled in the art easy implement the preferred embodiment of the present invention. In describing the exemplary embodiment of the present invention, detailed description of associated known functions or constitutions will be omitted if it is determined that they unnecessarily make the gist of the present invention unclear.

Hereinafter, a method of joint optimization of channel selection and frame scheduling for coexistence of LTE and WLAN in an unlicensed band according to the present invention will be described.

In association with the method, FIG. 1 illustrates a wireless communication system model according to the present invention. As illustrated in FIG. 1, the wireless communication system model assumes a cloud radio access network (C-RAN) structure which is an overlapped cell structure. That is, one cell is a macro cell served by an LTE base station (evolved NodeB (eNB)). In addition, one cell includes a plurality of small cells served by an LTE-U base station (Remote Radio Head (RRH)). Further, in at least some of the plurality of small cells, a WLAN service is performed by at least one WLAN AP (or WLAN node). Meanwhile, a user terminal indicated by an LTE node arranged in the macro cell may be disposed in the small cell.

Meanwhile, as illustrated in FIG. 1, a C-RAN has three following components. This is an interface having a large bandwidth and a low latency time, which connects 1) a distributed radio unit such as an evolved node B (eNB) or a remote radio head (RRH), 2) a baseband unit (BBU) pool, and 3) the BBU and a distributed radio unit. Meanwhile, the interface for connecting the BBU and the distributed radio unit may be a wired interface or a wireless interface. In addition, the interface may be implemented as the wired interface to avoid interference between radio signals and may be, for example, an optical fiber.

In the present invention, it is assumed that the eNB uses a licensed band and the RRH uses the unlicensed band. Further, a position k represents an area of a k-th RRH. Meanwhile, k=0 indicates an area which may not be covered (or served) by the RRHs. That is, at k=0, the unlicensed band may not be used. Meanwhile, an LTE user may simultaneously use two or more frequency fragments (i.e., component carriers (CC)) through carrier aggregation (CA) technology. In addition, it is assumed that there are several WLAN APs using the unlicensed band.

Figure 2:
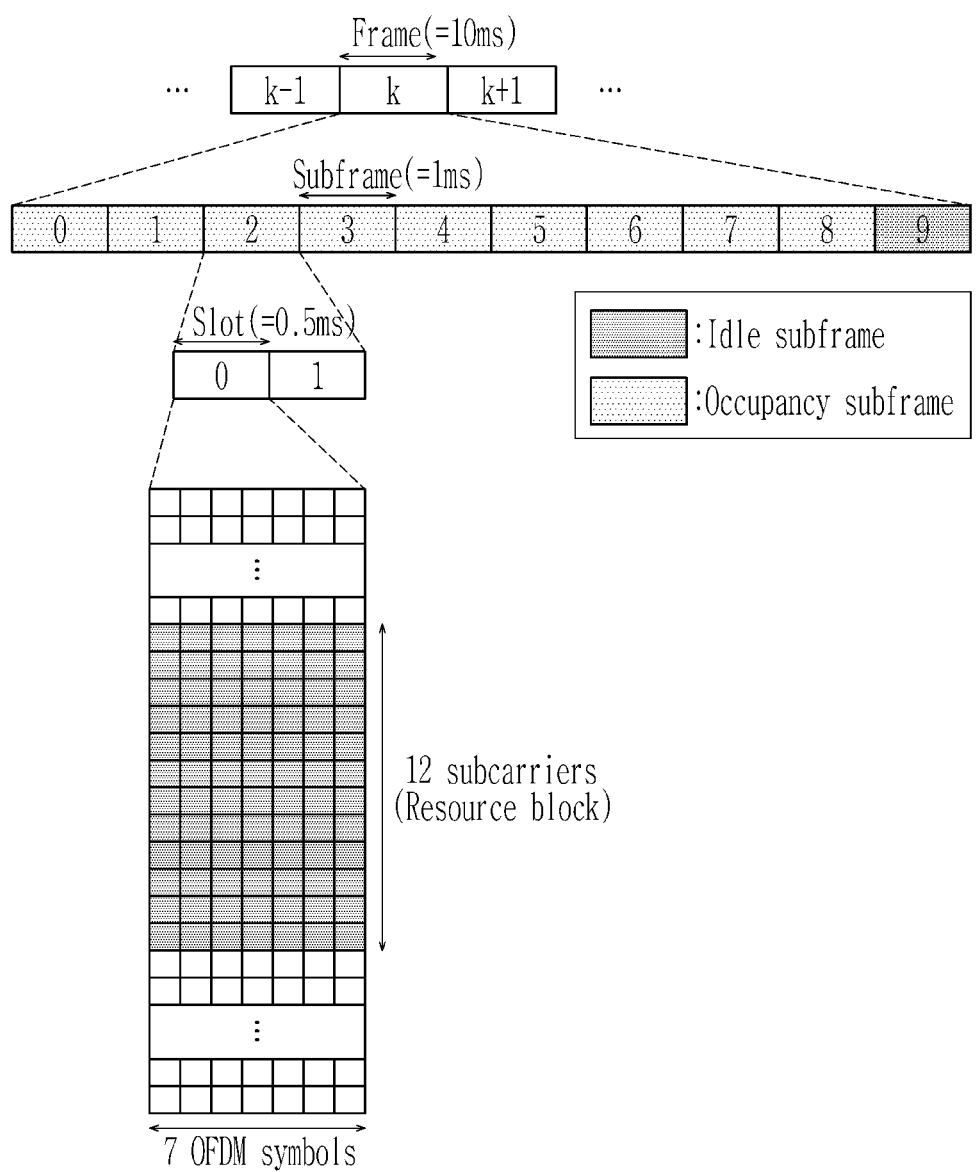
FIG. 2 illustrates an LTE frame structure in an unlicensed band according to the present invention.

FIG. 2 illustrates an LTE frame structure in an unlicensed band according to the present invention. An original LTE frame structure is constituted by 10 subframes. Since one subframe is 1 ms, the overall LTE frame structure is 10 ms. As one of ETSI recommendations for the unlicensed band, the unlicensed band needs to be used by using a listen before talk (LBT) mechanism. In the present invention, a frame-based LBT mechanism that is easy to apply to the LTE frame structure is used. That is, when a frame starts, it checks whether a channel is empty and data is transmitted for a channel occupancy time (COT) when the channel is empty. Thereafter, the channel may not be used by 5% of the COT. Meanwhile, when the channel is detected, the channel may not be used during a fixed frame period while the channel is being used. Since the frame-based LBT mechanism is used, when the unlicensed band is used, one LTE frame needs to have one or more idle subframes.

One subframe is constituted by two slots with a length of 0.5 ms. The slot is constituted by six or seven orthogonal frequency division multiple (OFDM) symbols. Meanwhile, a resource block (RB) of FIG. 2 is constituted by one slot as a time domain as a basic unit of LTE scheduling and is constituted by 12 consecutive sub-carriers as a frequency domain.

Figure 3:
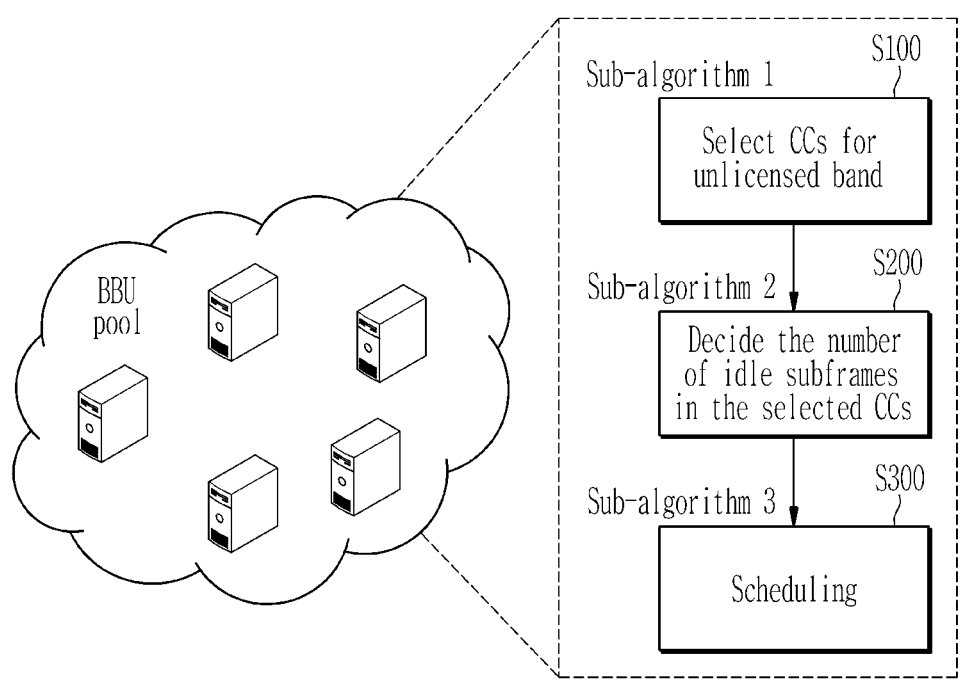
FIG. 3 illustrates an algorithm including a flowchart of a method of joint optimization of channel selection and frame scheduling for coexistence of LTE and WLAN in an unlicensed band according to the present invention.

FIG. 3 illustrates an algorithm including a flowchart of a method of joint optimization of channel selection and frame scheduling for coexistence of LTE and WLAN in an unlicensed band according to the present invention. That is, FIG. 3 illustrates an algorithm including a flowchart for jointly considering CC selection and frame scheduling. The algorithm may be constituted by three sub algorithms and may be referred to as a sequential operation algorithm (SOA). 1) First, a first sub algorithm selects a CC considering an idle probability of CC. 2) A next sub algorithm determines the number of idle subframes considering a residence time in a WLAN system queue. 3) A last sub algorithm allocates the RB to the LTE user so as to maximize throughput. In this case, the RB is allocated by considering even fairness among the LTE users.

Referring to FIG. 3, the method of joint optimization for channel selection and frame scheduling for coexistence of LTE and WLAN in an unlicensed band includes a CC selecting step (S100), an idle subframe determining step (S200), and a resource block allocating step (S300). Meanwhile, the optimization method may be performed by the baseband unit (BBU) pool, but is not limited thereto. For example, the CC selecting step (S100) and the idle subframe determining step (S200) may be performed by the baseband unit and the resource block allocating step (S300) may be performed by the RRH.

In the CC selecting step (S100), a CC having a highest idle probability is selected by considering an idle probability of a component carrier (CC) for the unlicensed band.

Next, in the idle subframe determining step (S200), the number of idle subframes ($N^I$) is determined in the selected CC in consideration of the residence time in a WLAN system queue.

Last, in the resource block allocating step (S300), the resource block (RB) is allocated to an LTE user terminal in a cell based on the number of selected CCs and the number of idle subframes. In this case, the RB is allocated to the LTE user so as to maximize the throughput. In this case, the RB is allocated by considering even the fairness among the LTE users.

FIG. 4 illustrates a pseudo code of a sub-algorithm for selecting a CC by considering an idle probability of the CC according to the present invention. That is, the pseudo code illustrated in FIG. 4 corresponds to the CC selecting step (S100) in FIG. 3. That is, the high idle probability means that the number of WLAN APs using the CC is small. Therefore, when the CC is used in the LTE system, not only high LTE system throughput may be obtained, but also enhanced fairness between the WLAN system and the LTE system may be obtained. To this end, $N_{CC}^k$ CCs with the highest idle probability are selected at all positions k.

More specifically, in the CC selecting step (S100) corresponding to the step of selecting the CC having the highest idle probability, $N_{CC}^k$ CCs having the idle probability in a high order are selected with respect to each of k plural small cells. Meanwhile, $N_{CC}^k$ CCs are determined according to carrier aggregation (CA) currently provided in a k-th small cell. In addition, in selecting $NCC^k$ CCs having the idle probability in the higher order, $NCC^k$ CCs may be selected in an order in which the number of WLAN APs using the CC is smaller.

The pseudo code of the sub algorithm for selecting the CC considering the idle probability of the CC according to FIG. 4 will be described below in more detail. High $p_{k,c}$ means that there are few WLAN APs using CC c at the position k and each AP may acquire a sufficient time period even though CC c is shared with the LTE. Hence, when the RRH utilizes CC c with high $p_{k,c}$ at the position k, high throughput of the LTE may be achieved while providing satisfactory fairness between the LTE and the WLAN. Based on such a concept, sub algorithm 1 selects $N^k{}_{CC}$ CCs with high $p_{k,c}$ in the unlicensed band. To this end, set $C_K$ including CCs of the unlicensed band usable at the position k and set $C_K^S$ constituted by CCs selected in the unlicensed band are first created (line 1 of sub algorithm 1). Next, the CCs used at the position k are selected for all positions except k=0. There is no need to select CCs because since the unlicensed band may not be used if k=0. To select the CCs when k is not 0, $p_{k,c}$ is computed as $(1-T_{k,c})^{Nk,c}$ (line 6 of sub algorithm 1). When Nk,c and $T_{k,c}$ are not given, $P_{k,c}$ can be predicted as $N_I^{k,c}/N^t$. Thereafter, the CC with the highest $p_{k,c}$ in $C_K$ is selected (line 7 of sub algorithm 1) and the selected CC is removed from $C_K$ and added to $C_K^S$ (line 8 of sub algorithm 1). Such a procedure is repeated until the number of selected CCs becomes the maximum number $N_{CC}^k$ of CCs that may be used by the RRH at the position k (i.e., $\Omega(C_K^S)=N_{CC}^k$).

FIG. 5 illustrates a pseudo code of a sub-algorithm for determining the number of idle subframes by considering a residence time in a WLAN system queue according to the present invention. A purpose of the algorithm is to ensure that the rate of increase in residence time in the WLAN system queue does not exceed σ which is a predetermined level. Therefore, the fairness between the LTE system and the WLAN system may be provided. A second sub algorithm has the following operation. First, $S_{k,c}^B$ which is the residence time in the WLAN system queue when no idle subframe is allocated is calculated. Then, since the WLAN system queue needs to be in a stable state, a value of the number $N_{k,c}^I$ of idle subframes in the LTE system using CC c at a minimum position k satisfying $(N_{k,c}^I/Ns)\mu_{k,c}<\lambda_{k,c}$ is found. Herein, Ns represents the number of subframes per frame. Further, $\mu_{k,c}$ and $\lambda_{k,c}$ mean a service processing speed and a packet arrival speed of the WLAN system using CC c at the position k. When there is no idle subframe in which the WLAN system queue may be stabilized, the corresponding CC is not used. Next, while increasing the number of idle subframes by one, a value of a minimum value $N_{k,c}^I$ where the rate of increase in residence time does not exceed σ is found.

The algorithm will be described below in more detail for each step. First, the algorithm described in FIG. 5 corresponds to the idle subframe determining step (S200) in FIG. 3.

The idle subframe determining step (S200) includes a step of calculating $S_{k,c}^B$ which is the residence time in the WLAN system queue when the idle subframe is not allocated. Further, the idle subframe determining step (S200) further includes a step of determining the number $N_{k,c}^I$ of idle subframes using CC c which is a c-th CC in the k-th small cell based on $(N_{k,c}^I/Ns)\mu_{k,c}<\lambda_{k,c}$. In this case, Ns, $\mu_{k,c}$, and $\lambda_{k,c}$ correspond to the number of subframes per frame, and the service processing speed and the packet arrival speed of the WLAN system using the CC c in the k-th small cell.

Meanwhile, the idle subframe determining step (S200) may further include a step of determining not to use the CC c when the number $N_{k,c}^I$ of idle subframes in which the WLAN system queue may be stabilized does not exist. Further, the idle subframe determining step (S200) may further include a step of determining the minimum number of idle subframes in which the rate of the increase in residence time in the WLAN system queue does not exceed σ which is a predetermined level while increasing the number $N_{k,c}^I$ of idle subframes by one. Meanwhile, the steps to be described above are not particularly limited to the order, but may be variously modified and used depending on an application. For example, when the number $N_{k,c}^I$ of idle subframes does not exist, before the step of determining not to use the CC c, the step of determining the minimum number of idle subframes in which the rate of the increase in residence time in the WLAN system queue does not exceed σ which is a predetermined level while increasing the number $N_{k,c}^I$ of idle subframes by one may be first performed. Meanwhile, when the number $N_{k,c}^I$ of idle subframes does not exist, after the step of determining not to use the CC c, the step of determining the minimum number of idle subframes in which the rate of the increase in residence time in the WLAN system queue does not exceed σ which is a predetermined level while increasing the number $N_{k,c}^I$ of idle subframes by one may be performed with respect to another CC c.

Meanwhile, the pseudo code of the sub algorithm for determining the number of idle subframes in consideration of the residence time in the WLAN system queue expressed in FIG. 5 will be described below in detail. The number $N^I$ of idle subframes is determined by sub algorithm 2. That is, the purpose of sub algorithm 2 is to retrieve the minimum number of idle subframes that satisfy the following constraints.

$$\frac{\mu_{k,c}-\lambda_{k,c}}{\alpha_{k,c}\mu_{k,c}-\lambda_{k,c}} \leq \sigma, \text{ for } \forall k; \forall c \in C_U \quad \text{(Equation 1)}$$

$$\alpha_{k,c}\mu_{k,c} > \lambda_{k,c}, \text{ for } \forall k, \forall c. \quad \text{(Equation 2)}$$

In this regard, when the LTE and the WLAN use the same CC, a time fraction of the WLAN may be substantially reduced and cause unfair problems. In order to solve the problem, the increased residence time rate of the WLAN needs to be maintained at a target rate or less. That is, when the LTE and the WLAN use the same CC, in the case where $S_{k,c}^A$ represents a maximum residence time of the WLAN using the CC c at the position k and $S_{k,c}^B$ just represents the maximum residence time of the WLAN using the CC c at the position K when the WLAN uses the CC c, $S_{k,c}^A/S_{k,c}^B \leq \sigma$ needs to be satisfied. $S_{k,c}^A$ and $S_{k,c}^B$ may be computed using an M/M/1 queuing model as described below. As described above, $\mu_{k,c}$ and $\lambda_{k,c}$ correspond to the service processing speed and the maximum packet arrival speed of the WLAN system using the CC c at the position k. Further, $\alpha_{k,c}$ represents a fraction of a time when the WLAN may transmit data when both the LTE and the WLAN using the CC c coexist at the position k. $\alpha_{k,c}$ may be computed as $N_{k,c}^I/Ns$ and herein, $N_{k,c}^I$ represents the number of idle subframes of the CC c at the position k. Accordingly, in summary, for coexistence of the LTE and the WLAN, the relationship shown in Equation 1 is established. Meanwhile, when $\alpha_{k,c}\mu_{k,c}\leq\lambda_{k,c}$ is established, the WLAN becomes unstable, and as a result, the relationship shown in Equation 2 needs to be established.

Referring back to sub algorithm 2, a small number of idle subframes may provide high LTE throughput. First, parameters such as σ, μ, and λ are initialized (line 1 of sub algorithm 2) and k and $N_{k,c}^I$ are set to 0 (line 2 of sub algorithm 2). Since the idle subframes are not required when k=0, determination of the number of idle subframes is required only for the case where k is not 0. In order to find the minimum number of idle subframes that satisfy Equation 2, sub algorithm 2 increases $N_{k,c}^I$ by one until the WLAN becomes stabilized (that is, $(N_{k,c}^I/Ns)\mu_{k,c}>\lambda_{k,c}$) (lines 8 to 10 of sub algorithm 2). When $N_{k,c}^I$ which stabilizes the WLAN does not exist, the current CC c is removed from $C_k^S$ (line 11 of sub algorithm 2). Otherwise, sub algorithm 2 retrieves the minimum number of $N_{k,c}^I$ that satisfies $S_{k,c}^A/S_{k,c}^B>\sigma$, which means that the increased residence time rate is maintained to be the target rate σ or less according to Equation 1. To this end, the sub algorithm 2 retrieves the minimum number of $N_{k,c}^I$ that satisfies $S_{k,c}^A/S_{k,c}^B$ σ while increasing $N_{k,c}^I$ by one (lines 15 and 16 of sub algorithm 2). When $N_{k,c}^I=9$ and $S_{k,c}^A/S_{k,c}^B>\sigma$ (that is, when the increased residence time rate may not be maintained to be the target rate σ or less), the current CC c is removed from $C_k^S$ (line 18 of sub algorithm 2). After determining $N_{k,c}^I$ for all cs belonging to $C_k^S$, $N_{k,c}^I$ is determined for the next position k (line 4 of sub algorithm 2). If the numbers of idle subframes at all positions k are determined, the algorithm ends.

FIG. 6 illustrates a pseudo code of an algorithm for RB allocation, which maximizes throughput while maintaining fairness among LTE users according to the present invention. Other RB allocation algorithms may be used. First, the RB is allocated to the LTE user who may not be allocated with the RB for a long time ($N_F$ or more frames). In this case, the RB is allocated to the corresponding user so as to maximize the throughput. Then, the remaining RBs are allocated in order from the LTE user having a best channel state in order to maximize the throughput.

Meanwhile, the pseudo code of FIG. 6 corresponds to the resource block allocating step (S300) of FIG. 3. In FIG. 3, in the resource block allocating step (S300) of allocating the resource block (RB) to the LTE user in the cell based on the number of selected CCs and the number of idle subframes, the RB is preferentially allocated to the first LTE user that may not be allocated with the RB for a predetermined time or more as described above. In this case, whether the predetermined time has elapsed may be based on $N_F$ or more frames. That is, in the resource block allocating step (S300), the RB capable of guaranteeing the maximum throughput is allocated to a first LTE user and the remaining RBs are allocated to a second LTE user which is an LTE user having a good channel state in order to maximize the throughput.

Meanwhile, the pseudo code of the algorithm for RB allocation, which maximizes the throughput while maintaining the fairness among the LTE users, which is expressed in FIG. 6 will be described below in detail. That is, the RB allocation corresponds to the resource block allocating step (S300) of FIG. 3 and is performed by sub algorithm 3. First, the RBs are preferentially allocated to starved users for a long time to provide the fairness among the LTE users.

Thereafter, the remaining RBs are allocated to the users to maximize the throughput. In order to achieve such a purpose, sub algorithm 3 obtains $m_{i,c,r}$ for all i, c, and r using the CQI reported from the users and defines a set $CR^A$ including allocated pairs (c, r) (lines 1 and 2 of sub algorithm 3). Further, i and k are initialized to 0 and −1, respectively (line 3 of sub algorithm 3). In order to provide the fairness among the LTE users, the algorithm retrieves user i with $ni \geq N_F$, meaning that user i is not scheduled contiguously for two frames. When there is predetermined user i with $ni \geq N_F$, then the algorithm retrieves pairs (c*, r*) providing the maximum throughput to user i in the licensed band (that is, $$(c^*, r^*) = \arg\max_{c \in C_L, r} m_{i,c,r}$$

(line 7 of sub algorithm 3). Since the CC c of the unlicensed band may not be used when the channel is busy, the licensed band needs to be allocated to users who have not been allocated with the licensed band for a long time. Thereafter, when the pairs c*, r* are not included in the $CR^A$, the pairs c*, r* are allocated to user i and added to the $CR^A$ (lines 9 and 10 of sub algorithm 3). Therefore, the fairness among the LTE users may be achieved. Thereafter, the remaining RBs are allocated to maximize the throughput (lines 16 to 33 of sub algorithm 3). To this end, when the number of CCs that may be aggregated by the users is less than the number of CCs selected at the position k (i.e., $N_{CA} < N_{CC}^k$), sub algorithm 3 allocates the users at the position k to the selected CCs (line 18 of sub algorithm 3). Otherwise, such an allocation process is not required. In general, random allocation and round robin allocation methods may be used to perform load balancing over the selected CCs. The random allocation methods are simple, but provide good load balancing among the CCs. After allocating the selected CCs to the users, respective RBs of all CCs in $C_K^S \cup C_L$ are allocated to the users with respect to all positions k. For each RB, sub algorithm 3 retrieves user i* with a highest MCS index of the users allocated to the CC c at the position k (i.e., $$i^* = \arg\max_{i \in I_{k,c}} m_{i,c,r}$$

and $I_{K,C}$ represents a set of users who may use the CC c at the position k). Thereafter, when the current pair (c, r) is not included in the $CR^A$ (line 23 of sub algorithm 3), the pair is assigned to user i* during all available sub frames (line 24 of sub algorithm 3). Thereafter, when the number of CCs allocated to user i* reaches the maximum number, user i* is removed from $I_{K,C}$ (line 28 of sub algorithm 3).

Since complexity of sub algorithm 3 is the highest among the sub algorithms described above, the complexity of SOA according to the present invention is determined by the complexity of the sub algorithm 3. That is, the complexity of the SOA is $O(\Omega(K) \, \Omega(C_K^S \cup C_L) \, \Omega(R) \log \Omega(I))$ (i.e., a polynomial function).

Meanwhile, the method of joint optimization of channel selection and frame scheduling for coexistence of LTE and WLAN in an unlicensed band in FIGS. 3 to 6 may be performed by a user terminal. That is, the method may be performed by a user terminal (LTE node or user equipment (UE)) corresponding to a mobile terminal in FIG. 1. In this regard, the user terminal may perform a step of being allocated with the resource block (RB) based on the number of CCs selected by the baseband unit (BBU) unit pool and the number $N^I$ of idle subframes. In this case, the selected CC is a CC having the highest idle probability considering the idle probability of the component carrier (CC) with respect to the unlicensed band and the number $N^I$ of selected idle subframes may be determined in consideration of the residence time in the WLAN system queue in the selected CC. In addition, the user terminal may perform a step of receiving data from an LTE-U base station (remote radio head (RRH)) through the selected RB.

A simulation is performed and the method is compared with the existing methods for performance evaluation of the method of joint optimization of channel selection and frame scheduling for coexistence of LTE and WLAN in an unlicensed band according to the present invention. In this regard, the sequential operation algorithm (SOA) represents the optimization method according to the present invention. On the contrary, RCMinI represents a method for arbitrarily selecting the CC and minimally allocating idle subframes, RCMaxI represents a method for arbitrarily selecting the CC and maximally allocating the idle subframes, and PCRI represents a method for selecting the CC by considering the idle probability and arbitrarily allocating the idle subframe, and last, PCMinI represents a method for selecting the CC by considering the idle probability and minimally allocating the idle subframes. Meanwhile, the performance evaluation is performed with the ratio $M^F$ of the throughput S and the number of WLAN APs in which the increase rate of the residence time in the WLAN system becomes larger than σ.

Figure 7:
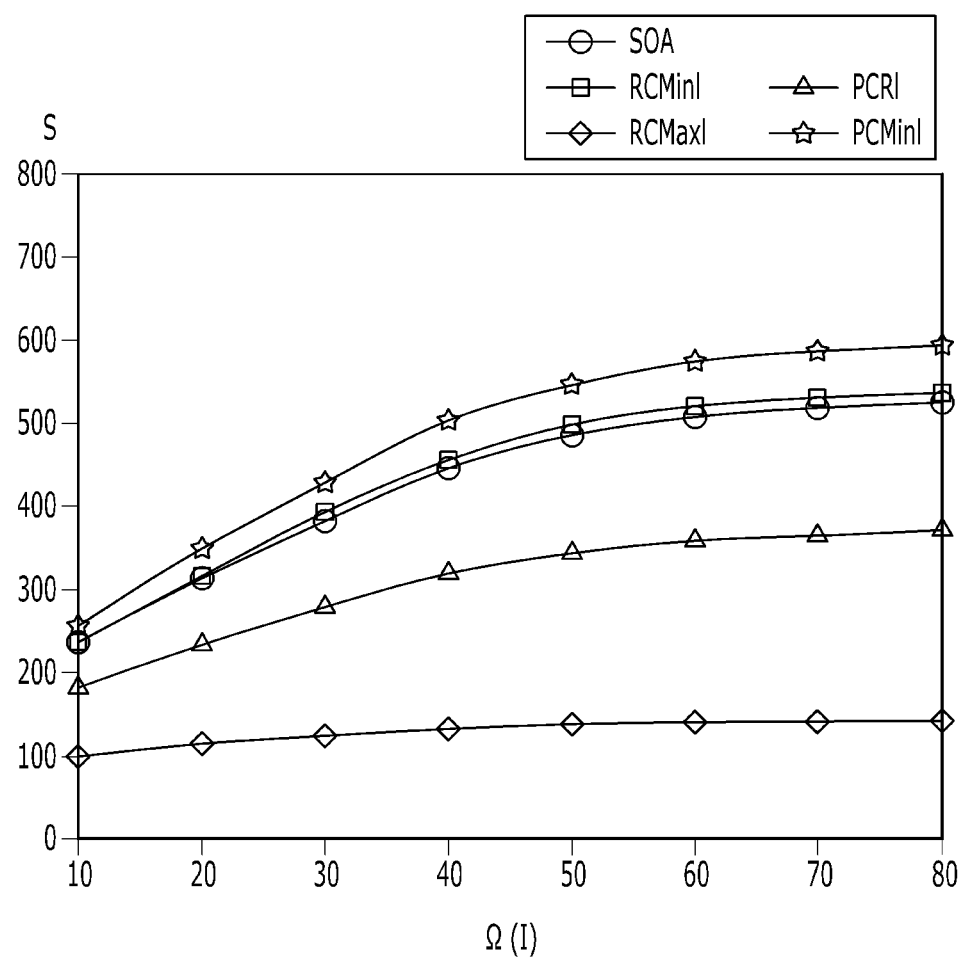
FIG. 7 illustrates a change in a ratio $M_F$ of the number of WLAN APs in which an increase ratio of throughput S and the residence time in the WLAN system becomes larger than σ as the number of LTE users increases according to the present invention.

In this regard, FIG. 7 illustrates a change in a ratio $M_F$ of the throughput S and the number of WLAN APs in which the increase ratio of the residence time in the WLAN system become larger than σ as the number of LTE users increases according to the present invention. As the number of users increases, it can be seen that the throughput of all methods increases through FIG. 7A. The reason is that the probability that there will be a user having the good channel state as the number of users increases becomes higher. Meanwhile, it can be seen that PCMinI has the maximum throughput. The reason is that not only the CC is selected based on the idle probability but also the minimum idle subframe is allocated. Meanwhile, it can be seen that the throughputs of the SOA and the RCMinI are similar. Since the SOA selects the CC used by a small number of WLAN APs, it is possible to achieve the throughput similar to that of RCMinI, which minimally allocates the idle subframes while preventing a large increase in residence time of the WLAN system by allocating more idle subframes. On the contrary, it can be seen that there is no WLAN AP having a rate of increase in residence time larger than σ in the WLAN system through FIG. 7B. That is, FIG. 7 shows that the SOA satisfies the fairness of the LTE and the WLAN while acquiring the high throughput.

Figure 8A:
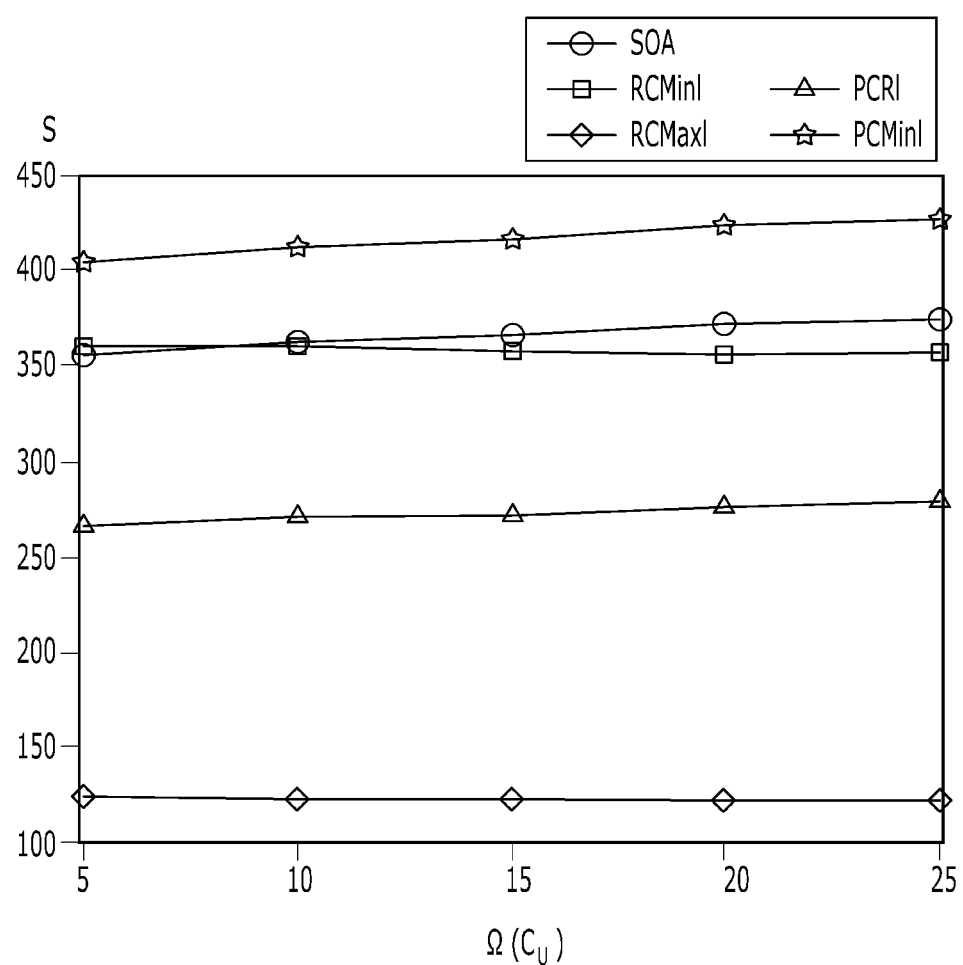
FIG. 8A, FIG. 8B and FIG. 8C are graphs illustrating an influence of the throughput S, the idle probability Pk,c, and an average CQI E[CQI] depending on the number of unlicensed band channels according to the present invention.
Figure 8B:
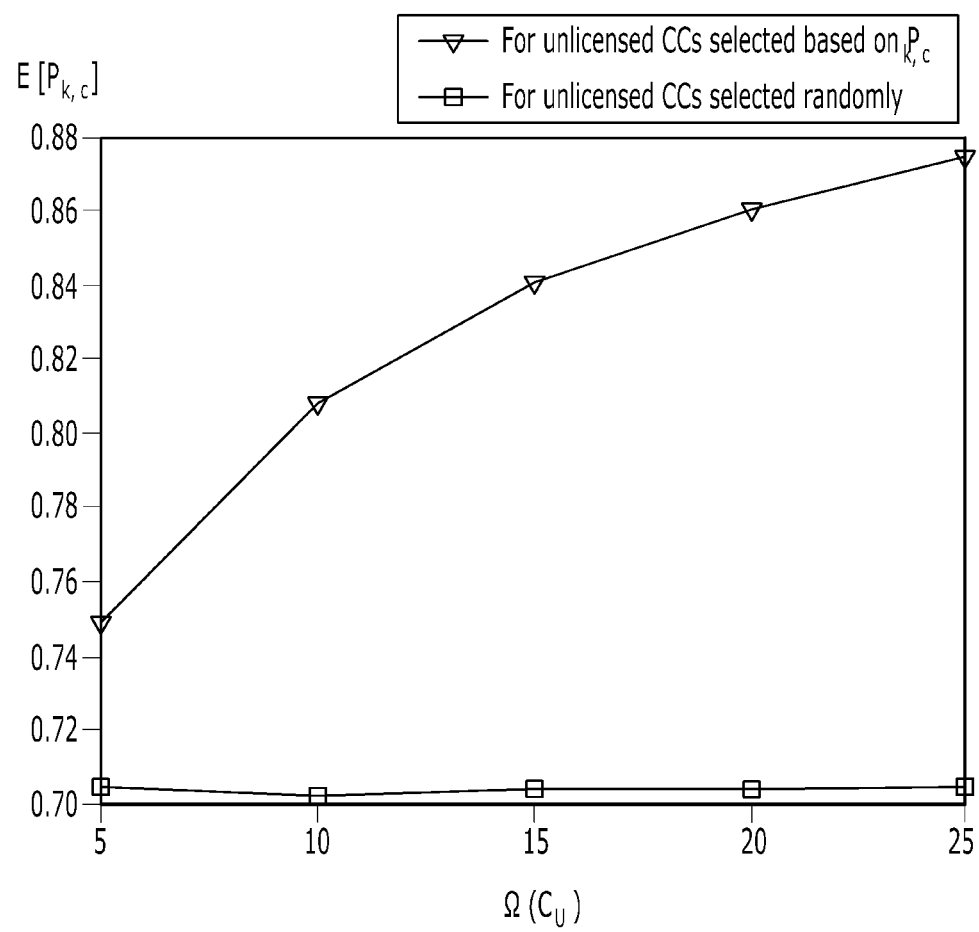
Figure 8C:
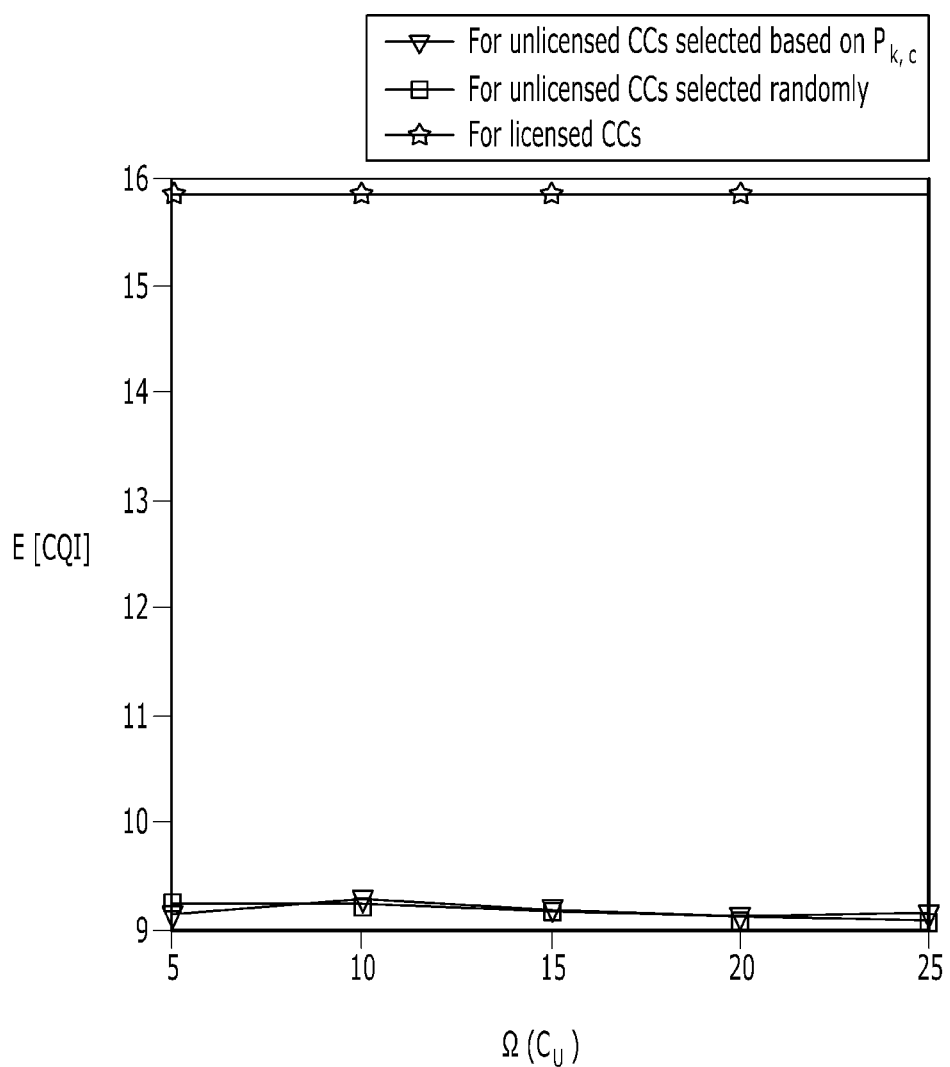

FIG. 8A, FIG. 8B and FIG. 8C are graphs illustrating an influence of the throughput S, the idle probability Pk,c, and an average CQI E[CQI] depending on the number of unlicensed band channels according to the present invention. According to FIG. 8A, it can be seen that as the number of channels in the licensed band increases, the throughput of the methods (i.e., SOA, PCRI, and PCMinI) for selecting the CC based on the idle probability increases. The reason for increasing the throughput is that as illustrated in FIG. 8C, channel states of the LTE users to which the RBs are allocated are similar, but as illustrated in FIG. 8B, when the CC is selected based on the idle probability, a probability that the LTE system may use the unlicensed band increases.

Figure 9:
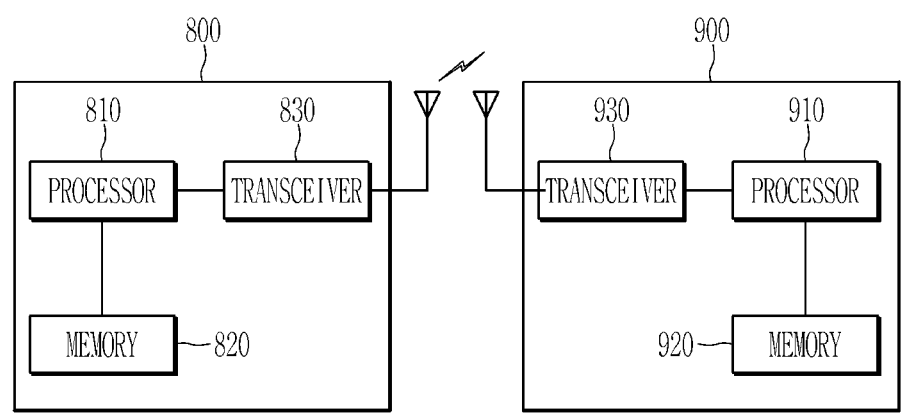
FIG. 9 illustrates a wireless communication system in which exemplary embodiments of the present invention are implemented.

Meanwhile, FIG. 9 illustrates a wireless communication system in which exemplary embodiments of the present invention are implemented. Herein, a first device 800 includes a processor 810, a memory 820, and a transceiver 830. The processor 810 may be configured to implement a function, a process, and/or a method described in the present specification. Layers of an interface protocol may be implemented by the processor 810. The memory 820 is connected with the processor 810 to store various pieces of information for driving the processor 810. The transceiver 830 is connected with the processor 810 to transmit and/or receive a signal.

A second device 900 includes a processor 910, a memory 920, and a transceiver 930. The processor 910 may be configured to implement a function, a process, and/or a method described in the present specification. The layers of the interface protocol may be implemented by the processor 910. The memory 920 is connected with the processor 910 to store various pieces of information for driving the processor 910. The transceiver 930 is connected with the processor 910 to transmit and/or receive the signal.

Meanwhile, the first and second devices 800 and 900 may include various combinations. For example, the first device 800 may be a user terminal and the second device 900 may be an RRH. Alternatively, the first device 800 may be a user terminal and the second device 900 may be an eNB. Alternatively, the first device 800 may be the user terminal and the second device 900 may be the WLAN AP. Alternatively, the first device 800 may be the user terminal and may be connected with at least one of a plurality of second devices 900. For example, the user terminal may be connected with at least one of the RRH and the WLAN AP. Meanwhile, in the method of joint optimization of channel selection and frame scheduling for coexistence of LTE and WLAN in an unlicensed band proposed by the present invention, it is assumed that the user terminal may be connected to both the RRH and the WLAN AP. Further, the user terminal may be configured to be connected to all of the eNB, the RRH, and the WLAN AP. In this case, the interface between the first and second devices 800 and 900 may be a radio interface, and the transmitted/received signal may be a radio signal.

Further, the first device 800 may be one of the eNB and the RRH and the second device 900 may be a BBU. In this case, information on the residence time in the WLAN system queue may be transferred from the WLAN AP (either through the user terminal or directly) to the second device 800. Thus, a direct interface between the WLAN AP and the BBU is not particularly required. In this case, a signal transmitted to/received from the interface between the first and second devices 800 and 900 may be the radio signal with the radio interface and a wired interface and a wired signal.

The processors 810 and 910 may include an application-specific integrated circuit (ASIC), another chipset, a logic circuit, and/or a data processing apparatus. The memories 820 and 920 may include a read-only memory (ROM), a random access memory (RAM), a flash memory, a memory card, a storage medium, and/or other storage devices. The transceivers 830 and 930 may include a baseband circuit for processing a radio frequency signal. When the exemplary embodiment is implemented by software, the aforementioned technique may be implemented by a module (a process, a function, and the like) that performs the aforementioned function. The module may be stored in the memories 820 and 920 and executed by the processors 810 and 910. The memories 820 and 920 may be positioned inside or outside the processors 810 and 910 and connected with the processors 810 and 910 by various well-known means.

In the exemplary system, methods that may be implemented in accordance with the features of the present invention described above have been described based on the flowchart. For easy description, the methods have been described as a series of steps or blocks, but the features of the present invention, which are claimed are not limited to the order of the steps or blocks and any step may occur in an order different from or simultaneously as the aforementioned step or order. Further, it can be appreciated by those skilled in the art that steps shown in the flowcharts are not exclusive and other steps may be included or one or more steps of the flowchart do not influence the scope of the present invention and may be deleted.

According to at least an exemplary embodiment of the present invention, is advantageous in that a resource is appropriately selected in a frequency domain and a time domain in LTE in the unlicensed band to acquire high throughput and fairness in the LTE and the WLAN in the unlicensed band.

Further, according to at least an exemplary embodiment of the present invention, it is advantageous in that in an optimization method according to the present invention, a component carrier is selected and the number of idle subframes is controlled to acquire the high throughput and the fairness in the LTE and the WLAN in the unlicensed band in an overlapped cell including a small cell.

According to software implementation, respective components as well as a procedure and a function described in the specification may be implemented by separate software modules. Each of the software modules may perform one or more functions and operations described in the specification. A software code may be implemented by a software application written by an appropriate program language. The software code may be stored in the memory and executed by the controller or processor.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 800, 900: First device, second device
810, 910: Processor
820, 920: Memory
830, 930: Transceiver

What is claimed is:

1. A method of joint optimization of channel selection and frame scheduling for coexistence of LTE and WLAN in an unlicensed band, the method being performed by a baseband unit (BBU) pool, comprising:
selecting a component carrier (CC) having a highest idle probability by considering an idle probability of the CC for the unlicensed band;
determining the number $N^I$ of idle subframes in the selected CC by considering a residence time in a WLAN system queue; and
allocating a resource block (RB) to an LTE user terminal in a cell based on the number of selected CCs and the number of idle subframes.

2. The method of claim 1, wherein:
the cell is a macro cell served by an LTE base station (eNB), the cell includes a plurality of small cells served by an LTE-U base station (remote radio head (RRH)), and a WLAN service is performed by at least one WLAN AP in at least some of the plurality of small cells.

3. The method of claim 2, wherein:
in selecting the CC having the highest idle probability, $N_{CC}^k$ CCs having the idle probability in a higher order are selected with respect to k respective plural small cells and $N_{CC}^k$ CCs are determined according to carrier aggregation (CA) currently provided by a k-th small cell, and
in selecting $N^{CCk}$ CCs having the idle probability in the higher order, $N^{CCk}$ CCs are in an order in which the number of WLAN APs using the CC is smaller.

4. The method of claim 1, wherein:
the determining of the number $N^I$ of idle subframes in the selected CC includes,
calculating $S_{k,c}^B$ which is the residence time in the WLAN system queue when no idle subframe is allocated, and
determining the number $N_{k,c}^I$ of idle subframes using CC c which is a c-th CC in a k-th small cell based on $(N_{k,c}^I/Ns)\mu_{k,c} < \lambda_{k,c}$, Ns, $\mu_{k,c}$, and $\lambda_{k,c}$ representing the number of subframes per frame, and a service processing speed and a packing arrival speed of a WLAN system using the CC c in the k-th small cell, respectively.

5. The method of claim 4, wherein:
the determining of the number $N^I$ of idle subframes in the selected CC further includes,
determining not to use the CC c when the number $N_{k,c}^I$ of idle subframes in which the WLAN system queue may be stabilized does not exist, and
determining the minimum number of idle subframes in which the rate of the increase in residence time in the WLAN system queue does not exceed σ which is a predetermined level while increasing the number $N_{k,c}^I$ of idle subframes by one for another CC c.

6. The method of claim 2, wherein:
in the allocating of the resource block (RB) to the LTE user terminal in the cell based on the number of selected CCs and the number of idle subframes,
the RB is preferentially allocated to a first LTE user which may not be allocated with the RB for a predetermined time or more,
the RB capable of guaranteeing maximum throughput is allocated to the first LTE user, and
the remaining RBs are allocated to a second LTE user which is an LTE user having a good channel state in order to maximize throughput.

7. A method of joint optimization of channel selection and frame scheduling for coexistence of LTE and WLAN in an unlicensed band, the method being performed by an LTE terminal, comprising:
allocating a resource block (RB) based on the number of component carriers (CCs) selected by a baseband unit (BBU) pool and the number $N^I$ of idle subframes, the selected CC representing a CC having a highest idle probability considering an idle probability of the CC with respect to the unlicensed band and the number $N^I$ of selected idle subframes being determined by considering a residence time in a WLAN system queue in the selected CC, and
receiving data from an LTE-U base station (remote radio head (RRH)) through the selected RB.

* * * * *